United States Patent [19]
De Boer et al.

[11] Patent Number: 5,139,088
[45] Date of Patent: Aug. 18, 1992

[54] METHOD OF INHIBITING ASPHALT PRECIPITATION IN AN OIL PRODUCTION WELL

[75] Inventors: Roelof B. De Boer, Rijswijk; Lodewikus N. J. De Jong, Delft, both of Netherlands

[73] Assignee: Shell Oil Company, Houston, Tex.

[21] Appl. No.: 577,984

[22] Filed: Sep. 5, 1990

[30] Foreign Application Priority Data

Sep. 6, 1989 [GB] United Kingdom ............... 8920090

[51] Int. Cl.[5] ..................... E21B 37/06; E21B 43/40
[52] U.S. Cl. ..................... 166/267; 166/279; 166/310; 166/371
[58] Field of Search ............... 166/266, 267, 279, 304, 166/310, 371, 313; 252/8.3, 8.552

[56] References Cited

U.S. PATENT DOCUMENTS

| 119,884 | 10/1871 | Roberts | 166/304 X |
|---|---|---|---|
| 2,245,870 | 6/1941 | Norman | 166/310 X |
| 2,704,979 | 3/1955 | Van Willigen | 166/304 X |
| 2,765,850 | 10/1956 | Allen | . |
| 2,799,342 | 7/1957 | Alhambra | 166/304 X |
| 3,437,146 | 4/1969 | Everhart et al. | 166/304 X |
| 3,574,319 | 4/1971 | Morgenthaler | 166/304 |
| 3,945,435 | 3/1976 | Barry | 166/267 |
| 4,119,149 | 10/1978 | Wu et al. | 166/266 |
| 4,223,728 | 9/1980 | Pegg | 166/266 |
| 4,418,752 | 12/1983 | Boyer et al. | 166/267 |
| 4,465,138 | 8/1984 | Hunt, III. | 166/303 |
| 4,617,993 | 10/1986 | Brown | 166/279 X |
| 4,756,368 | 7/1988 | Ikuta et al. | 166/267 |
| 4,767,545 | 8/1988 | Karydas et al. | 252/8.3 |
| 4,919,207 | 4/1990 | Ikuta et al. | 166/267 |

FOREIGN PATENT DOCUMENTS

83/01273 4/1983 World Int. Prop. O. .

OTHER PUBLICATIONS

"High-Pour-Point and Asphaltic Drude Oils and Condensates," Robert N. Tuttle, Journal of Petroleum Technology, pp. 1192-1196, Jun. 1983.
SPE 18892, "Asphaltene Deposition: A Comprehensive Description of Problem Manifestations and Modeling Approaches," K. J. Leontaritis, Production Operations Symposium, Mar. 12-14, 1989, Oklahoma City.

Primary Examiner—George A. Suchfield

[57] ABSTRACT

Asphalt precipitation in the flow path of an oil production well is inhibited by splitting the produced crude oil in a separator train into a light fraction containing gaseous and oil components having a relatively low aromaticity and molar weight and a heavy fraction having a relatively high aromaticity and molar weight and subsequently reinjecting at least part of the heavy fraction to a location in the flow path of the well where asphalt precipitation is expected to occur.

8 Claims, 1 Drawing Sheet

METHOD OF INHIBITING ASPHALT PRECIPITATION IN AN OIL PRODUCTION WELL

BACKGROUND OF THE INVENTION

This invention relates to a method for the production of oil. More particularly this invention pertains to a method of inhibiting asphalt precipitation in the flow path of an oil production well.

Asphalt precipitation may occur during the production of crude oil at any location in the flow path of an oil production well. This flow path extends from the reservoir formation surrounding the inflow zone of the well, via the production tubing or tubings within the well to the production lines near the wellhead. At each location precipitation of asphalt may seriously impede the productivity of the well. Asphalt or asphaltenes are together with wax or paraffin one of the most serious clogging constituents of crude oil. Numerous attempts have been made to restrict precipitation of these clogging constituents by injecting suitable solvents into the flow path of an oil production well.

U.S. Pat. No. 3,574,319 discloses that paraffin deposition in a paraffin-containing oil production well can be prevented by injection of asphaltic crude oil into the well.

U.S. Pat. No. 4,756,368 discloses that cracked oil fractions may be reinjected into a well to maintain a wax-containing crude oil in fluid state. European patent 89,986 discloses that condensed gaseous phases of well effluents may be reinjected into a well to avoid paraffin or asphalt precipitation. U.S. Pat. No. 2,765,850 discloses that dewaxed oil may be reinjected into a production well to reduce wax deposition.

The article, "High-Pour-Point and Asphaltic Crude Oils and Condensates," published by R. N. Tuttle in the *Journal of Petroleum Technology* of June 1983, discloses that circulation of oil was used as early as 1944 to reduce the asphaltenes problem.

U.S. Pat. No. 4,767,545 mentions that prevention or removal of asphaltenes deposits can be attempted chemically through the use of aromatic solvents, solvent accelerators, or the resinous components of crudes, but that these procedures can be prohibitively expensive and may not be effective.

It is an object of the present invention to provide an efficient method of inhibiting asphalt precipitation in an oil production well which does not require injection of expensive solvents or the utilization of special treatment plants for reinjection of specific fractions of the produced crude oil into the well.

SUMMARY OF THE INVENTION

Figure 1:
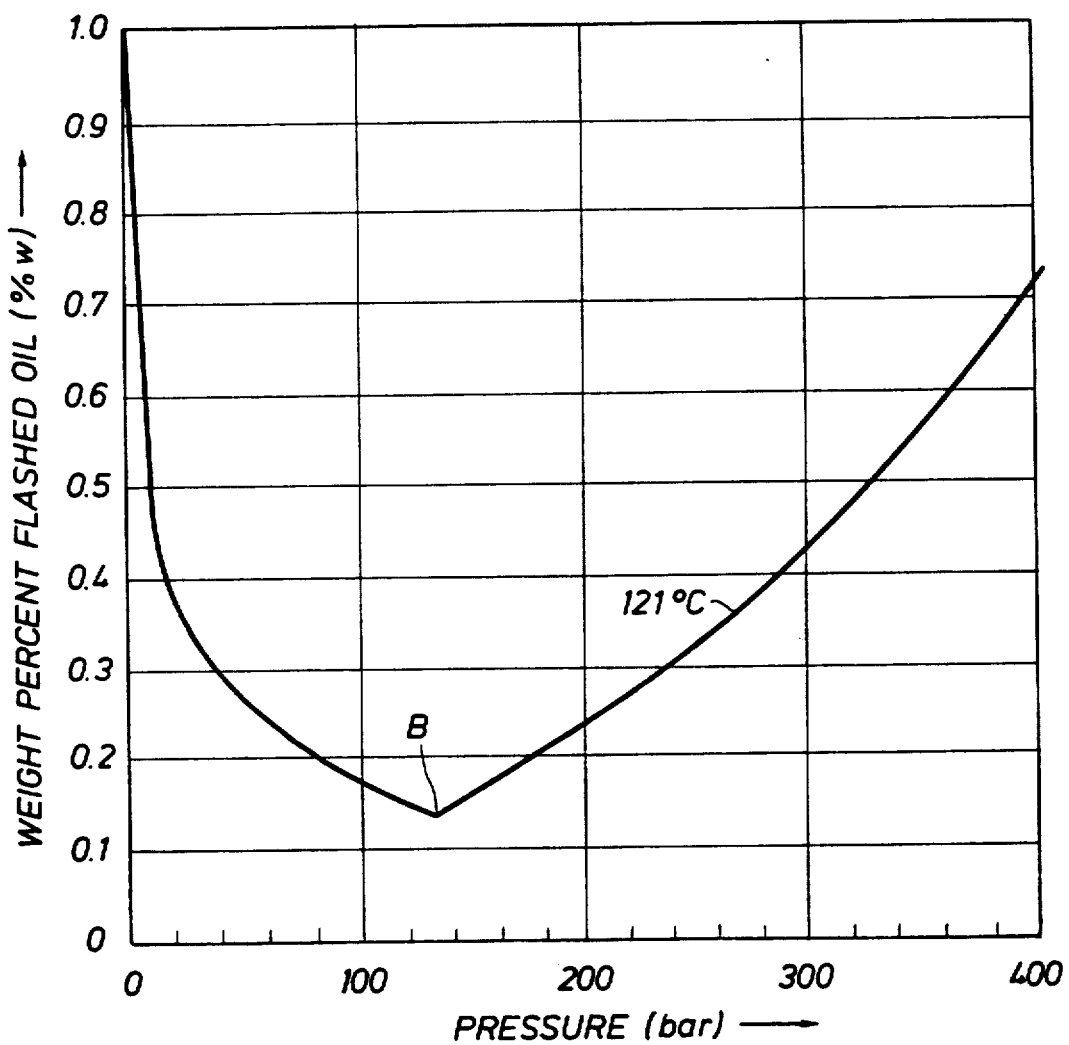
FIG. 1 shows the character of solubility of asphalt in oil.

According to the invention there is provided a method of inhibiting asphalt precipitation in the flow path of an oil production well comprising:
transporting crude oil to a separator;
separating the crude oil in the separator in the separator into a light fraction containing gaseous and oil components having a relatively low aromaticity and molecular weight and a heavy fraction containing oil components having a relatively high aromaticity and molar weight;
reinjecting at least part of the heavy fraction to a location in the flow path of the well where asphalt precipitation is expected to occur; and
producing a mixture of crude oil and the heavy fraction via the well.

DETAILED DESCRIPTION OF THE INVENTION

The present invention is based on the insight that asphalt is more soluble in a crude oil fraction having a high aromaticity and molar weight than in a gaseous crude oil fraction having a low aromaticity and molar weight, and that therefore the solubility of asphalt is higher in a degassed or flashed heavy fraction flowing from a separator or separator train than in the crude oil produced from the well. For a typical highly undersaturated crude oil, i.e., a crude oil which is under a much higher reservoir pressure than its bubble point pressure the solubility of asphalt may be a factor of three higher in the flashed oil flowing from the separator train than in the crude oil produced from the well.

The flashed heavy fraction may be reinjected into any part of the flow path of the production well where asphalt precipitation is expected to occur. In many cases it is desirable to reinject the heavy fraction into the lower part of a production tubing which is suspended within the well or into the reservoir formation surrounding the intake zone of such a production tubing.

It is furthermore preferred that less than about 50 percent of the flashed heavy fraction is reinjected into the well and that the molecular weight of the reinjected heavy fraction is more than about 78 g/mol, or even more preferably more than about 100 g/mol.

The solubility of asphalt in the reinjected heavy oil fraction is preferably at least two times the solubility of the asphalt in the crude oil.

The invention will be described in more detail with reference to the accompanying drawing which shows the character of solubility of asphalt in oil (expressed as weight percent of flashed oil) in case of varying pressure (in bar) near the bubble point (B) of the oil.

Most natural crude oils contain dissolved asphalt in concentrations ranging from about 0.1% up to or exceeding about 10 percent. Solubility of the asphalt in the oil depends for a great part on the aromaticity of the oil and the pressure. Solubility can be expressed by the equation:

$$S = exp[-1 + V_a\{1/\bar{V}_o - (\delta_a - \bar{\delta}_o)^2/RT\}]$$

where
S = solubility of asphalt in oil
V = molar volume
a = asphalt component
o = oil phase
δ = solubility parameter (Asphalts have δ-values in the range of about 20–22 Mpa$^{\frac{1}{2}}$, aromatics have δ-values about 18.5 Mpa$^{\frac{1}{2}}$ and paraffins have δ-values about 16 Mpa$^{\frac{1}{2}}$.)
R = gas constant and
T = temperature The equation indicates that the solubility of asphalt in oil increases with increasing aromaticity and molecular weight. Below the bubble point it increases as degassing increases both aromaticity and molar weight. Therefore the solubility of asphalt in oil has a character as indicated in the drawing: relatively high asphalt solubilities at high and at low pressure and a minimum solubility at or around the bubble point B. When the flashed heavy oil fraction flowing from the separator train, in which asphalt is already more soluble due to the degassing, is pressurized again its aromaticity and molecular weight remain constant, and thus the solubility parameter rises even more, and so does the asphalt solubility. Therefore this repressurized flashed heavy oil fraction is a cheap, effective, and directly available precipitation inhibitor and solvent for asphalt.

EXAMPLE

A crude oil of API gravity 40 and of low aromaticity resides in a reservoir under 400 bar and 121° C. Its bubble point is at 140 bar and the asphalt solubility decreases from about 0.7 percent at reservoir conditions to about 0.15 percent at bubble point (both values expressed as weight percent of the flashed oil). As the crude oil in the reservoir contains 0.5 percent asphalt, the expected drop out of asphalt in a production well via which reservoir fluids are produced is appreciable. Addition to the lower end of a production tubing extending through the well of e.g., 20 percent flashed oil, in which asphalt has a solubility of approximately 1 percent, will result in a mixture in which the asphalt is sufficiently soluble even at the bubble point, where the solubility of asphalt is minimal, so that no asphalt precipitation in the tubing and the production lines at the wellhead will occur.

What is claimed is:

1. A method of inhibiting asphalt precipitation in the flow path of an oil production well comprising:
    transporting crude oil to a separator;
    separating the crude oil in the separator into a light fraction containing gaseous and oil components having a relatively low aromaticity and molecular weight and a heavy fraction containing oil components having a relatively high aromaticity and molar weight;
    injection at least part of the heavy fraction to a location in the flow path of the well where asphalt precipitation is expected to occur; and
    producing a mixture of crude oil and said heavy fraction via the well.

2. The method of claim 1 wherein less than about 50 percent of the heavy fraction is reinjected into the well.

3. The method of claim 2 wherein the molar weight of the injected heavy fraction of the crude oil is more than about 78 g/mol.

4. The method of claim 2 wherein the solubility of asphalt in the reinjected heavy fraction is at least two times the asphalt content of the crude oil.

5. The method of claim 1 wherein the molar weight of the reinjected heavy fraction of the crude oil is more than about 78 g/mol.

6. The method of claim 5 wherein the molecular weight of the reinjected heavy fraction is more than about 100 g/mol.

7. The method of claim 5 wherein the solubility of asphalt in the reinjected heavy fraction is at least two times the asphalt content of the crude oil.

8. The method of claim 1 wherein the solubility of asphalt in the reinjected heavy fraction is at least two times the asphalt content of the crude oil.

* * * * *